(12) United States Patent
Iwata et al.

(10) Patent No.: US 10,654,438 B2
(45) Date of Patent: May 19, 2020

(54) CURTAIN AIRBAG DEVICE

(71) Applicant: AUTOLIV DEVELOPMENT AB, Vargarda (SE)

(72) Inventors: Tetsuya Iwata, Yokohama (JP); Kazumasa Arakawa, Yokohama (JP); Kazuyuki Yamaguchi, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 153 days.

(21) Appl. No.: 15/578,030

(22) PCT Filed: Apr. 26, 2016

(86) PCT No.: PCT/JP2016/062995
§ 371 (c)(1),
(2) Date: Nov. 29, 2017

(87) PCT Pub. No.: WO2016/194521
PCT Pub. Date: Dec. 8, 2016

(65) Prior Publication Data
US 2018/0290617 A1    Oct. 11, 2018

(30) Foreign Application Priority Data
Jun. 5, 2015   (JP) .................................. 2015-114463

(51) Int. Cl.
*B60R 21/232*    (2011.01)
*B60R 21/237*    (2006.01)
(Continued)

(52) U.S. Cl.
CPC .......... *B60R 21/232* (2013.01); *B60R 21/214* (2013.01); *B60R 21/237* (2013.01);
(Continued)

(58) Field of Classification Search
CPC ................ B60R 21/232; B60R 21/214; B60R 21/23138; B60R 21/237; B60R 2021/23169
See application file for complete search history.

(56) References Cited

U.S. PATENT DOCUMENTS 6,234,516 B1 * 5/2001 Boxey .................... B60R 21/232
280/729
6,361,068 B1 * 3/2002 Stein ...................... B60R 21/232
280/730.2
(Continued)

FOREIGN PATENT DOCUMENTS

EP    2 151 360 A1    2/2010
JP    2004-338542 A    12/2004
(Continued)

OTHER PUBLICATIONS

International Search Report for PCT/JP2016/062995, dated Jun. 21, 2016.

*Primary Examiner* — Paul N Dickson
*Assistant Examiner* — Timothy Wilhelm
(74) *Attorney, Agent, or Firm* — Dickinson Wright PLLC

(57) ABSTRACT

A curtain airbag apparatus (100) is provided with an inflator (106), and a cushion (102) stored, in an elongated storage form, on an inner side of a headliner above a front side window (110), and receives the gas to inflate. The cushion (102) in the storage form has a bent-over portion (142) which is formed by bending over a rear end (136) of the cushion (102) towards a center side thereof from a state in which the cushion (102) is rolled upwards. The state of the cushion (102) when the bending over is performed i.e. the rolled state of the cushion (102), is achieved by rolling the cushion (102) from a state in which a prescribed area at the
(Continued)

rear end (136) of the cushion (102) in a deployed state is folded over towards the center side in the vehicle front-rear direction.

8 Claims, 7 Drawing Sheets

(51) Int. Cl.
  *B60R 21/214* (2011.01)
  *B60R 21/231* (2011.01)
(52) U.S. Cl.
  CPC .................. *B60R 21/23138* (2013.01); *B60R 2021/23169* (2013.01)

(56) References Cited

U.S. PATENT DOCUMENTS

| | | | |
|---|---|---|---|
| 6,659,930 B2 * | 12/2003 | Florsheimer | B60R 21/237 280/728.1 |
| 6,758,490 B2 * | 7/2004 | Hoeft | B60R 21/232 280/730.2 |
| 7,261,682 B2 * | 8/2007 | Crookston | B60R 21/232 280/743.1 |
| 7,380,815 B2 * | 6/2008 | Rose | B60R 21/213 280/728.2 |
| 7,404,790 B2 * | 7/2008 | Sugaya | B60R 21/213 280/743.1 |
| 7,441,796 B2 * | 10/2008 | Noguchi | B60R 21/232 280/730.2 |
| 7,516,978 B2 * | 4/2009 | Quach | B60R 21/213 280/730.2 |
| 7,641,220 B2 * | 1/2010 | Visker | B60R 21/20 24/295 |
| 7,766,376 B2 * | 8/2010 | Yokoyama | B60R 21/237 280/730.2 |
| 7,806,433 B2 * | 10/2010 | Mitsuo | B60R 13/0225 280/728.2 |
| 7,832,760 B2 * | 11/2010 | Mitsuo | B60R 21/232 280/729 |
| 8,033,569 B2 * | 10/2011 | Yamanishi | B60R 21/232 280/728.2 |
| 8,282,124 B2 * | 10/2012 | Trovato | B60R 21/232 280/730.2 |
| 8,308,192 B2 * | 11/2012 | Konishi | B60R 21/213 280/730.2 |
| 8,376,397 B2 * | 2/2013 | Yamamura | B60R 21/213 280/730.2 |
| 8,414,020 B2 * | 4/2013 | Beppu | B60R 21/232 280/728.2 |
| 8,430,423 B2 * | 4/2013 | Matsuda | B60R 21/04 280/728.2 |
| 8,579,323 B2 * | 11/2013 | Kato | B60R 21/213 280/729 |
| 8,636,301 B1 * | 1/2014 | Wang | B60R 21/232 280/730.2 |
| 8,727,373 B2 * | 5/2014 | Mori | B60R 21/213 280/728.2 |
| 8,740,247 B1 * | 6/2014 | Jovicevic | B60R 21/232 280/730.2 |
| 8,894,094 B2 * | 11/2014 | Wang | B60R 21/232 280/730.2 |
| 9,145,103 B2 * | 9/2015 | Kashio | B60R 21/231 |
| 9,150,187 B1 * | 10/2015 | Schiftan | B60R 21/233 |
| 9,278,661 B2 * | 3/2016 | Jovicevic | B60R 21/213 |
| 9,409,543 B2 * | 8/2016 | Steinbrecher | B60R 21/237 |
| 9,487,178 B2 * | 11/2016 | Kawamura | B60R 21/237 |
| 9,505,371 B2 * | 11/2016 | Kawamura | B60R 21/2334 |
| 9,566,935 B2 * | 2/2017 | Hicken | B60R 21/232 |
| 9,610,916 B2 * | 4/2017 | Kawamura | B60R 21/232 |
| 9,956,935 B2 * | 5/2018 | Kawamura | B60R 21/232 |
| 9,994,187 B2 * | 6/2018 | Okuhara | B60R 21/237 |
| 10,000,174 B2 * | 6/2018 | Okuhara | B60R 21/2338 |
| 2006/0138749 A1 * | 6/2006 | Nakamura | B60R 21/237 280/728.2 |
| 2009/0127836 A1 * | 5/2009 | Umeda | B60R 21/232 280/730.2 |
| 2010/0013203 A1 * | 1/2010 | Mitchell | B60R 21/232 280/743.2 |
| 2010/0032928 A1 | 2/2010 | Yamanishi et al. | |
| 2010/0225097 A1 * | 9/2010 | Trovato | B60R 21/232 280/730.2 |
| 2012/0139215 A1 * | 6/2012 | Heuschmid | B60R 21/233 280/730.2 |
| 2014/0239619 A1 * | 8/2014 | Fukawatase | B60R 21/232 280/730.2 |
| 2015/0151708 A1 * | 6/2015 | Kawamura | B60R 21/232 280/728.2 |
| 2015/0375710 A1 * | 12/2015 | Sievers | B60R 21/237 280/730.2 |
| 2016/0001732 A1 * | 1/2016 | Asada | B60R 21/232 280/729 |
| 2016/0297394 A1 * | 10/2016 | Fujiwara | B60R 21/237 |

FOREIGN PATENT DOCUMENTS

| | | |
|---|---|---|
| JP | 2010-069968 A | 4/2010 |
| JP | 2014-169036 A | 9/2014 |
| JP | 5651711 B2 | 1/2015 |
| JP | 2015-217688 A | 12/2015 |
| WO | WO 2012/090637 A1 | 7/2012 |

* cited by examiner

CURTAIN AIRBAG DEVICE

CROSS-REFERENCE TO RELATED APPLICATIONS

This application is a 35 U.S.C. § 371 national phase application of PCT International Application No. PCT/JP2016/062995, filed Apr. 26, 2016, which claims the benefit of priority under 35 U.S.C. § 119 to Japanese Patent Application No. JP 2015-114463, filed Jun. 5, 2015, the contents of which are incorporated herein by reference in their entirety.

FIELD OF THE INVENTION

The present invention relates to a curtain airbag apparatus that inflates and deploys along a side surface in a vehicle cabin with the goal of protecting an occupant during a vehicle side collision or rollover (overturning).

BACKGROUND

A curtain airbag apparatus is an airbag apparatus that protects an occupant from an impact from a vehicle width (lateral) direction due to a side collision or the like. An airbag cushion (hereinafter simply referred to as "cushion") of a curtain airbag apparatus has a relatively large shape which inflates and deploys along a side window, and is stored on an inner side of an interior material such as a headliner (also called a roof trim) above the side window.

Generally, the cushion of a curtain airbag apparatus is, for example, folded in a bellows shape in an up-down direction or rolled in a roll shape in an up-down direction, and stored in a storage form that is elongated in a vehicle front-rear direction. In Japanese Publication No. 2004-338542, for example, a cushion in an elongated state can be installed in an even narrower storage space by further bending over a rear end side thereof in the vehicle front-rear direction.

However, when an end portion of a cushion in an elongated state is bent over and the cushion is stored as in the above-cited reference, a bent-over portion at the end portion of the cushion is longer when a storage space therefor is narrower. Although the bent-over portion is eliminated by gas pressure when the cushion inflates and deploys, an operation in which the bent-over portion is eliminated is larger when the folded over portion is longer. Therefore, if an excessively long area of the cushion is bent over, the operation during inflation and deployment is larger, significant interference occurs between the cushion and the headliner, and restraint of the occupant may be delayed.

In view of such problems, an object of the present invention is to provide a curtain airbag apparatus capable of contributing to early restraint of an occupant in addition to achieving a cushion storage form that is more compact.

SUMMARY OF THE INVENTION

In order to solve the abovementioned problems, the curtain airbag apparatus according to the present invention has a representative configuration which includes an inflator which supplies gas, and a cushion which is stored, in an elongated storage form in a vehicle front-rear direction, on an inner side of a headliner above a side window, and receives the gas so as to inflate and deploy. The cushion in the storage form has a bent-over portion which is obtained by bending over a front end or a rear end of the cushion towards a center side thereof from a state in which the cushion is folded or rolled upwards from below, and the state in which the cushion is folded or rolled is achieved by folding or rolling the cushion from a state in which a prescribed area at a front end side or a rear end side of the cushion in a deployed state is folded over towards the center side in the vehicle front-rear (longitudinal) direction.

The cushion in the storage form is folded over and bent over at an end thereof in the vehicle front-rear direction, such that the length of the cushion in the vehicle front-rear direction is short. Accordingly, the cushion is easily stored, even in the limited storage space on the inner side of the headliner. Further, in the storage form described above, folding over is carried out in advance so that the length of a bent-over portion need only be short. Accordingly, an operation in which the bent-over portion is eliminated during inflation and deployment is smaller, and the degree to which the cushion interferes with the headliner is also reduced. Accordingly, the configuration described above allows the cushion to be quickly inflated and deployed so that an occupant can be restrained at an early stage.

The prescribed area to be folded over described above may be the rear end side of the cushion. In vehicles such as a trucks or SUVs (Sport Utility Vehicles), for example, there are cases where a pillar having a shape which is relatively upright with respect to the vehicle front-rear direction is present at a rear side, such that the storage space for the cushion is more limited. The configuration described above enables, even in such a case, suitable realization of a storage form for a cushion in which the cushion can be stored in a compact form.

The prescribed area to be folded over described above is an area of the cushion outside a plurality of strike point positions of a testing apparatus in an ejection mitigation performance evaluation test. In a form of an ejection mitigation performance evaluation test, the testing apparatus is caused to collide with a plurality of locations on the cushion from the vehicle inner side, and an amount of ejection thereof is measured. The testing apparatus also serves to simulate an occupant and, by using the strike point positions as a guide and folding over an area which does not encompass any of the strike point positions, a compact storage form for the cushion can be realized without affecting the occupant ejection mitigation performance thereof.

A fold at which the fold over described above is implemented is formed in an inflation region of the cushion into which gas is introduced. With such a configuration, the gas pressure during inflation and deployment of the inflation region can be used to eliminate the folded over portion quickly.

The prescribed area to be folded over described above may be folded over to a vehicle inner side in a vehicle width direction. Due to this configuration, the prescribed area can be folded over appropriately.

The bent-over portion described above may be bent over to a vehicle lower side. Due to this configuration, the bent-over portion can be suitably provided.

The bent-over portion described above may be bent over to a vehicle inner side in the vehicle width direction. Due to this configuration, the bent-over portion can be suitably provided.

With the present invention, a curtain airbag apparatus can be provided which is capable of contributing to early restraint of an occupant in addition to achieving a cushion storage form that is more compact.

DETAILED DESCRIPTION OF THE INVENTION

Figure 1A:
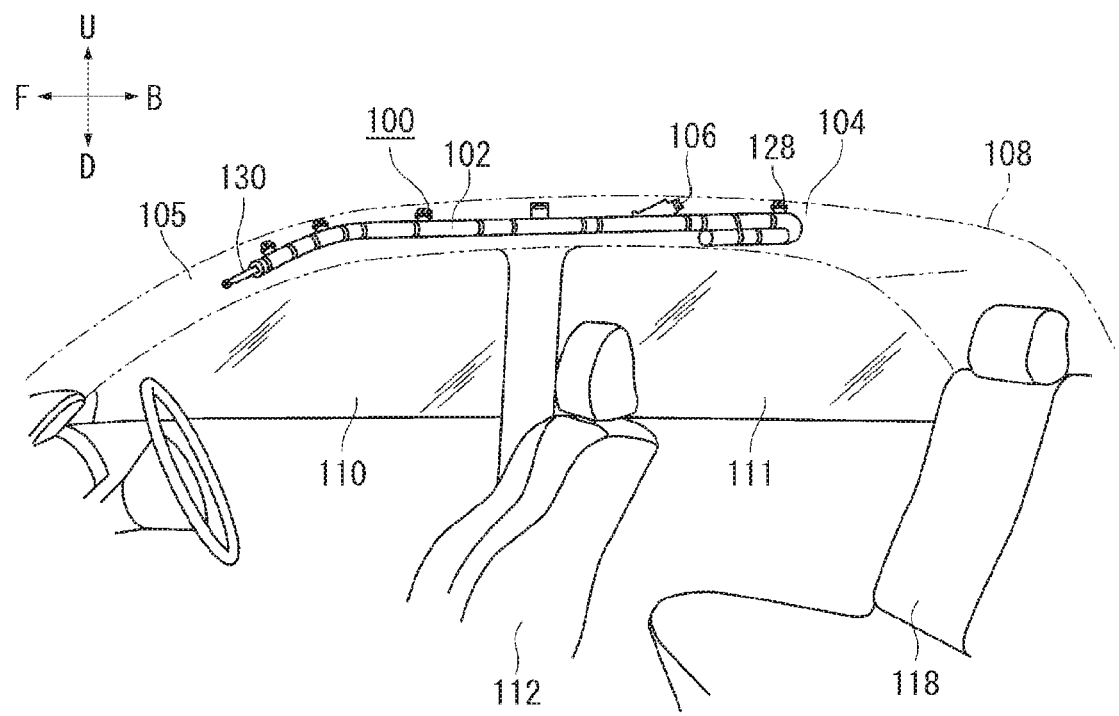
FIGS. 1(a) and 1(b) are side views illustrating a curtain airbag apparatus according to an embodiment of the present invention.

A preferred embodiment of the present invention will be described hereinafter in detail with reference to the accompanying drawings. Dimensions, materials, other concrete numerical values, and so on indicated in this embodiment are merely examples intended to facilitate understanding of the invention and, unless indicated otherwise, do not limit the present invention. Note that, in this specification and in the drawings, elements that have a substantially identical function and/or configuration are denoted by the same reference numerals, thereby eliminating redundant explanations, and elements that are not directly related to the present invention have been omitted.

Figure 1B:
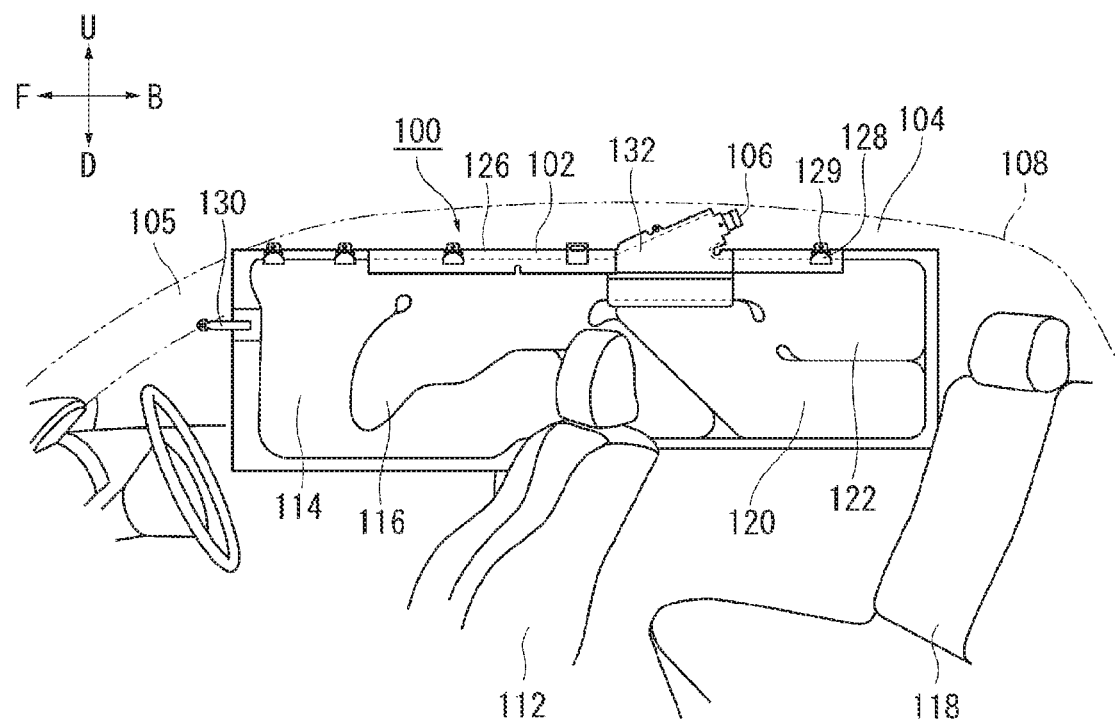

FIGS. 1(a) and 1(b) are diagrams illustrating a curtain airbag apparatus 100 according to an embodiment of the present invention. FIG. 1(a) is a diagram showing a vehicle cabin interior as viewed from a vehicle inner side in a vehicle width direction, and illustrates a pre-operation state of the curtain airbag apparatus 100. In the present embodiment, the curtain airbag apparatus 100 is applied to the right side wall of a vehicle body, as an example. In FIGS. 1(a) and 1(b) and all other drawings of the present application, the vehicle front-rear (or longitudinal) direction is denoted by the F (Forward) and B (Back) arrows, the vehicle left-right (or lateral) direction is denoted by the L (Left) and R (Right) arrows, and the vehicle up-down (vertical) direction is denoted by the U (up) and D (down) arrows.

FIG. 1(a) illustrates the pre-operation state of an airbag cushion (hereinafter cushion 102). The cushion 102 is rolled up into a roll-shaped storage state which is elongated in the vehicle front-rear direction, and is mounted on a roof side rail 104 above a front side window 110 and so on. Normally, the roof side rail 104 is covered with a headliner (not shown), that is, an interior trim material. The pre-operation (undeployed) cushion 102 is stored in a space on an inner side of the headliner, and cannot be visually perceived from the inside of the vehicle cabin where an occupant is present. Therefore, it should be noted that despite explanations in the main body text referencing "the cushion 102 as seen from inside the vehicle cabin", the cushion 102 is actually visually imperceptible from the inside of the vehicle cabin, but has been rendered visible in the diagrams by omitting the headliner therefrom. Note that the storage form of the cushion 102 can also be realized by folding the cushion 102 in a bellows shape from below.

The curtain airbag 100 includes an inflator 106, that is, a gas generating device, which is provided at the top of the cushion 102, and the cushion 102 inflates due to the pressure of the gas supplied from the inflator 106 so as to restrain the occupant. The inflator 106 adopted in the present embodiment is a cylinder-type inflator, and has an elongated cylindrical shape. Inflators popular at present include a type that is filled with a gas generating agent and generates gas by causing combustion thereof, a type which is filled with compressed gas and supplies the gas without generating heat, a type which is provided with both a gas generating agent and compressed gas (hybrid type), and so on. Any of these types of inflator can be used as the inflator 106.

FIG. 1(b) is a view illustrating a post-inflation and deployment state of the cushion 102 shown in FIG. 1(a). When a side collision, rollover, or the like occurs in the vehicle 108, an impact is initially detected by a sensor (not shown) provided in the vehicle 108, which causes a signal to be transmitted to the inflator 106. On receiving this signal, the inflator 106 activates so as to supply the gas to the cushion 102. On receiving the gas from the inflator 106, the cushion 102 inflates and deploys in a downward direction along a side wall of the vehicle body (the front side window 110 and so on in FIG. 1(a)), thereby restraining the occupant.

Figure 2:
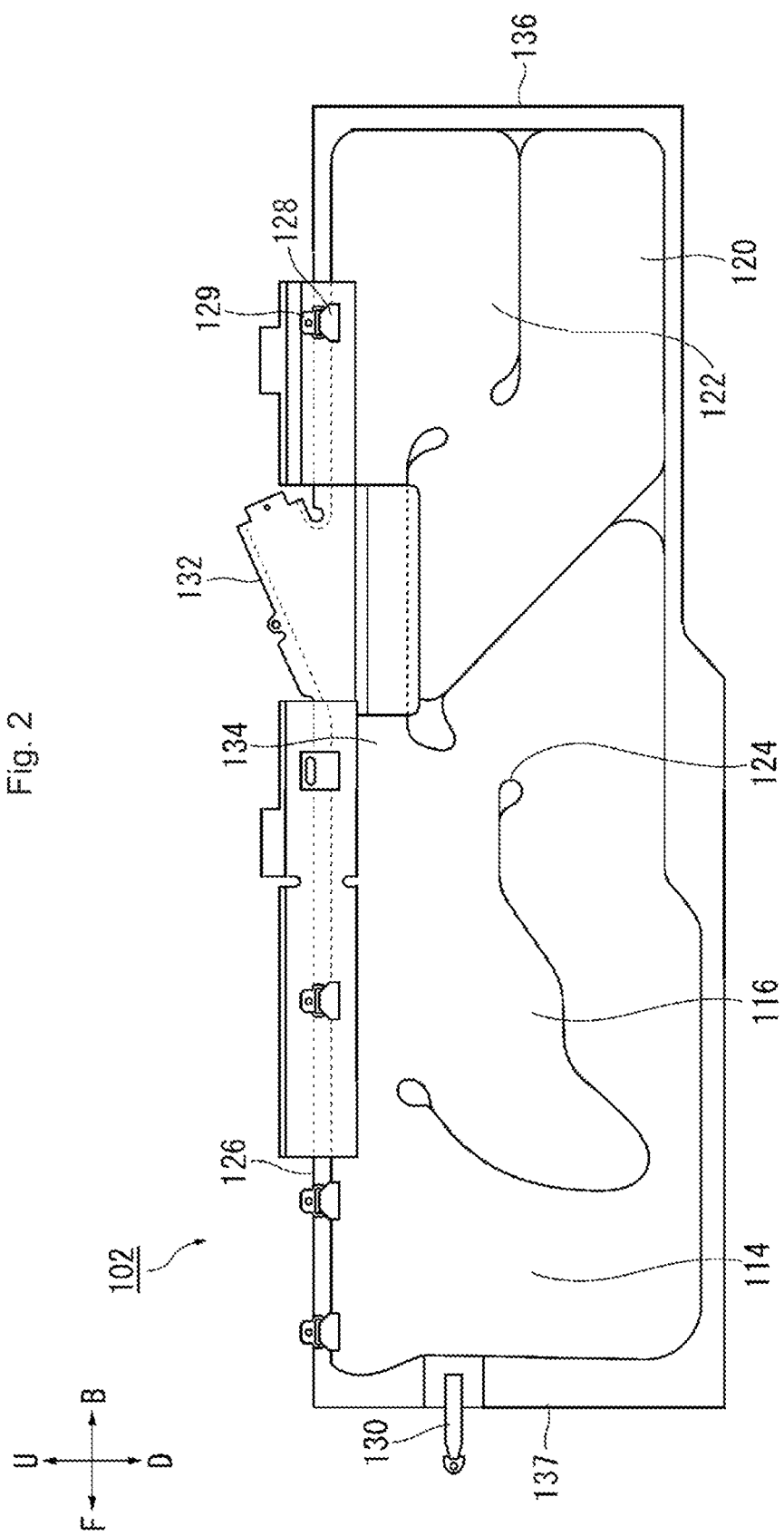
FIG. 2 is a side view illustrating the cushion shown in FIG. 1(b) on its own.

FIG. 2 is a diagram illustrating the cushion 102 shown in FIG. 1(b) on its own. The cushion 102 is a cushion for use in curtain airbags, and accordingly has a large shape that is capable of expanding along a side surface in a vehicle cabin. The cushion 102 is formed as a bag shape by layering two pieces of base fabric which constitute the surface of the cushion 102 one on top of the other and sewing or adhering the pieces of base fabric together, by sewing using an OPW (One-Piece Woven) method, and so on.

A plurality of tabs 128 are provided near an upper edge 126 of the cushion 102 as attachment portions for attaching the cushion 102 to the vehicle 108. The tabs 128 are each formed from a belt-shaped base cloth, and a small bracket 129 or the like is attached thereto. The brackets 129 are attached to the roof side rail 104 (see FIG. 1(a)) by bolts or the like. In addition, a string-shaped strap 130 is provided at a front end of the cushion 102. The strap 130 connects the cushion 102 to a front pillar 105, and stabilizes deployment behaviour of the cushion 102 by suppressing rocking thereof during inflation and deployment and, in addition, applies tension to the cushion 102 in the vehicle front-rear direction.

An inflator insertion portion 132 is provided near the center at the top of the cushion 102. The inflator insertion portion 132 is provided so as to project upwards from the upper edge 126, and the inflator 106 (see FIG. 1(b)) is inserted therein and attached. The inflator insertion portion 132 communicates with a duct portion 134 thereunder, and sends the gas from the inflator 106 to the duct portion 134. The duct portion 134 extends in the vehicle front-rear direction at the top side of the cushion 102 and guides the gas to the vehicle front side and the vehicle rear side of the cushion 102.

The inflation area of the cushion 102 is partitioned into a plurality of chambers with consideration to positions with which an occupant could feasibly come into contact. For example, front chambers 114 and 116 and the like are provided at the vehicle front side with the goal of protecting an occupant in a front seat 112 (see FIG. 1(b)). Rear chambers 120 and 122 and the like are provided at the vehicle rear side to protect an occupant in a rear seat 118. The chambers are partitioned by providing, for example, a partitioning portion 124, which is a linear region in which inflation does not occur, between each of the chambers.

Figure 3A:
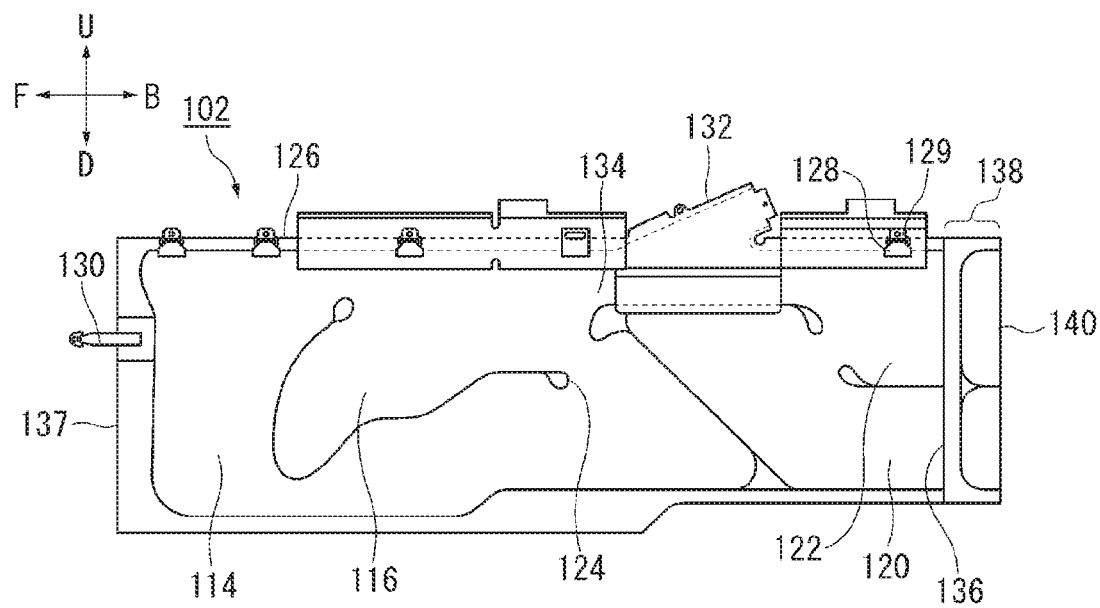
FIGS. 3(a), 3(b), and 3(c) are side views illustrating a process of folding the cushion shown FIG. 2 into a storage form.
Figure 3B:
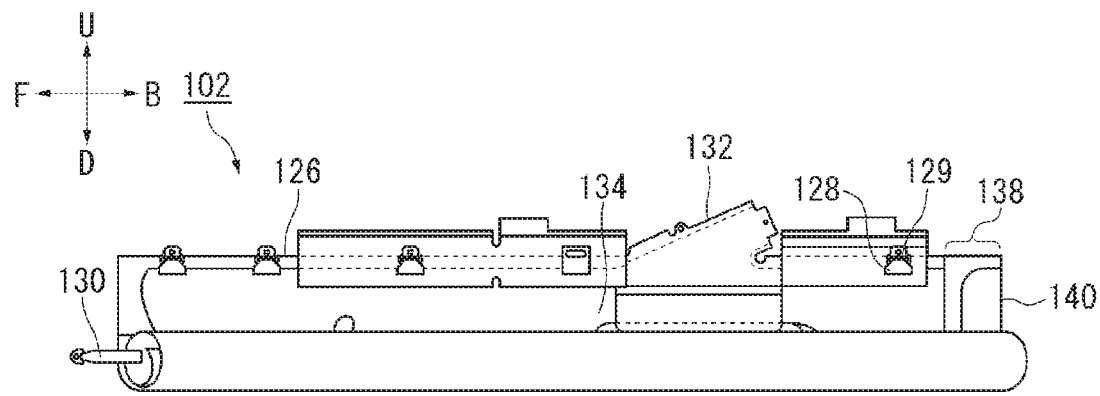
Figure 3C:
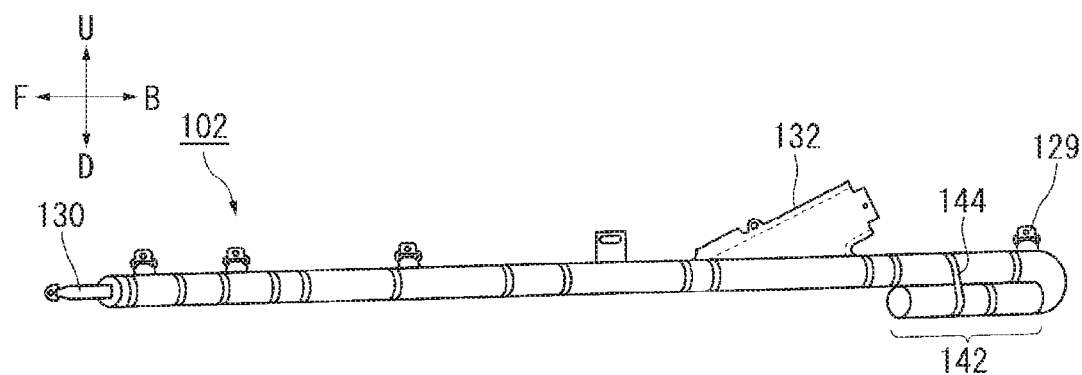

In the present embodiment, the cushion 102 is folded into a storage form that is both compact and contributes to early restraint of an occupant. FIGS. 3(a)-3(c) are views illustrating a process of folding the cushion 102 shown FIG. 2 into the storage form.

As illustrated in FIG. 3(a), initially, a prescribed area at the rear end 136 side of the cushion 102 in a flat deployed state prior to the gas being introduced is folded over toward a center side in the vehicle front-rear direction. In other words, prescribed areas at the vehicle rear side of the rear chambers 120 and 122 of the cushion 102 are folded over towards the vehicle front side. A folded over portion 138 is provided as a result of this folding over. A fold 140, which is formed due to the folding over at this time, is formed in the rear chambers 120 and 122 of the cushion 102 so as to extend in the vehicle up-down direction.

The folded over portion 138 is eliminated by gas pressure during inflation and deployment. In order to efficiently eliminate the folded over portion 138 at such a time, the fold 140 of the folded over portion 138 is formed so as to span the inflation area of the rear chambers 120, 122, and the like. As described above, the folded over portion 138 is configured to be efficiently and quickly eliminated by the introduction of gas into the rear chambers 120 and 122.

Next, as illustrated in FIG. 3(b), the cushion 102 is rolled upwards from below from a state in which the folded over portion 138 is folded over. In the present embodiment, the folded over portion 138 is folded over in such a form that a prescribed area at the vehicle rear side of the rear chambers 120 and 122 of the cushion 102 (see FIG. 3(a)) overlaps the rest of the cushion 102 on the vehicle inner side in the vehicle width direction. The rolling of the cushion 102 is also such that, in the same way, the cushion 102 is rolled on the vehicle inner side in the vehicle width direction. Accordingly, the operation in which the folding over and rolling is eliminated also takes place on the vehicle inner side, whereby the deployment behaviour of the cushion 102 can be stabilized.

As illustrated in FIG. 3(c), the cushion 102 in the rolled state is provided with the bent-over portion 142 by further bending over the rear end of the cushion 102, which is provided with the folded over portion 138, towards the center side. In other words, at least a portion of the folded over portion 138 constitutes the bent-over portion 142. After the bent-over portion 142 has been formed, the storage form is completed by bundling together each part of the cushion 102 using tape 144 or the like which can be broken during inflation and deployment.

Figure 4A:
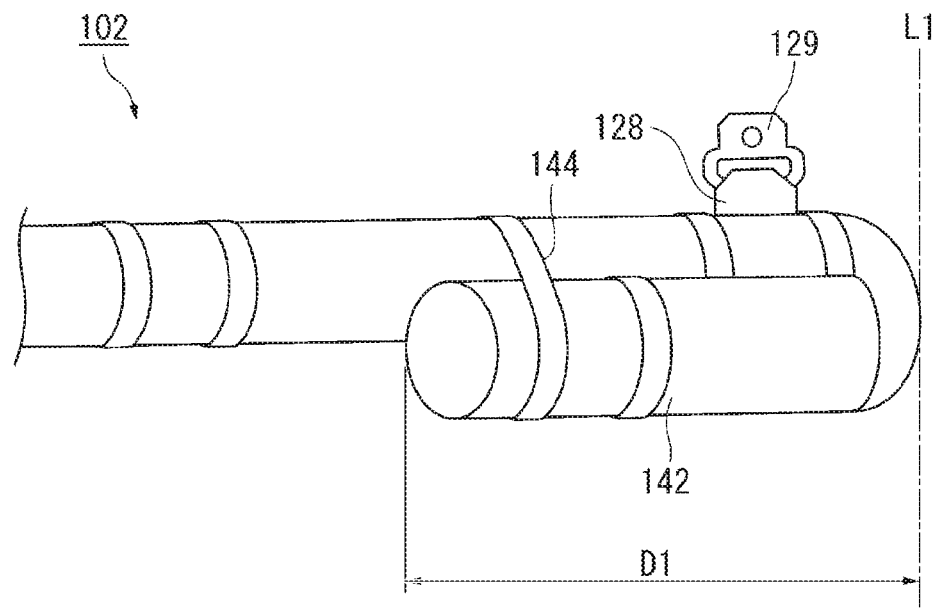
FIGS. 4(a) and 4(b) are partial isometric views comparing the cushion shown in FIG. 3(b) and a cushion of a comparative example.
Figure 4B:
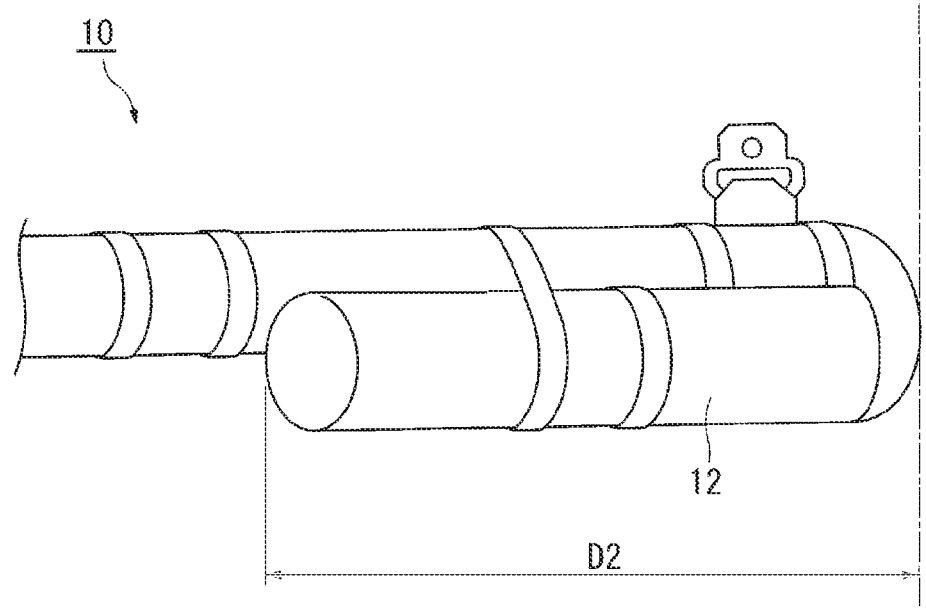

FIGS. 4(a) and 4(b) are diagrams comparing the cushion 102 shown in FIG. 3(c) and a cushion 10 of a comparative example. The cushion 10 of the comparative example differs from the structure of the cushion 102 in that the folded over portion 138 illustrated in FIG. 3(a) is not formed therein.

The cushion 102 and the cushion 10 are folded into storage forms having the same length, as illustrated by the line L1. However, the cushion 102 can be stored in the storage space by providing only a short bent-over portion, i.e. bent-over portion 142 (length D1) due to the provision of the folded over portion 138 (see FIG. 3(a)). However, as the cushion 10 is not provided with the folded over portion 138, a bent-over portion 12 (length D2), which is longer than the bent-over portion 142, is required to make the cushion 10 the same length as the cushion 102 upon deployment.

FIGS. 5(a)-5(d) are diagrams illustrating the respective inflation and deployment processes of the cushion 102 according to the present embodiment shown in FIGS. 4(a) and 4(b), and the cushion 10 of the comparative example.

FIGS. 5(a)-5(d) illustrated the respective states of the cushions 102 and 10 during a deployment test, as viewed from the vehicle inner side and from the rear of the vehicle. Note that, in FIGS. 5(a)-5(d), the cushions 102 and 100 are applied to a left side wall of the vehicle body, but do not differ from the configurations of the cushions 102 and 10 described with reference to FIG. 1 to FIGS. 4(a) and 4(b) in any way apart from being line symmetrical thereto.

Figures 5A, 5B, 5C, 5D:
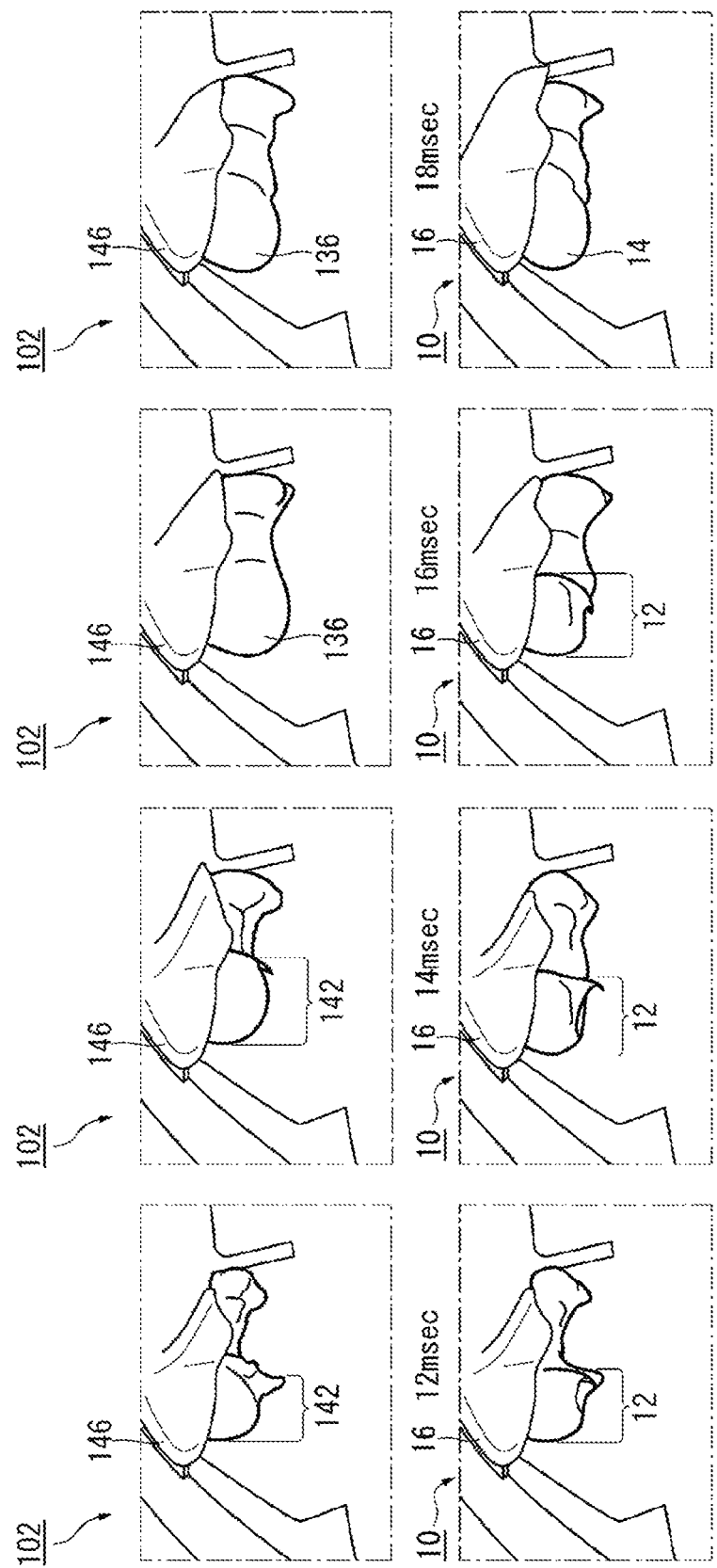
FIGS. 5(a), 5(b), 5(c), and 5(d) are diagrams illustrating the respective inflation and deployment processes of the cushion according to the present embodiment shown in FIGS. 4(a) and 4(b), and the cushion of the comparative example.

FIGS. 5(a) to 5(d) illustrate, on the top row, the cushion 102 according to the present embodiment and, on the bottom row, the cushion 10 of the comparative example. FIG. 5(a) illustrates the respective states of the cushion 102 and the cushion 10 at 12 msec (milliseconds) after operation of the inflator 106 (see FIG. 1(a)) commences. The cushions 102 and 10 push the respective headliners 146 and 16 out of the way so as to inflate and deploy in a downward direction.

FIG. 5(b) illustrates the respective states of the cushion 102 and the cushion 10 at 14 msec after operation of the inflator 106 (see FIG. 1(a)) commences. In both of the cushions 102 and 10, the bent-over portions 142 and 12 interfere with the headliner 146 as the fold is eliminated. FIG. 5(c) illustrates the respective states of the cushion 102 and the cushion 10 at 16 msec after operation of the inflator 106. As the bent-over portion 142 of the cushion 102 is short, interference with the headliner 146 at the rear end 136 side is eliminated by this point in time. Meanwhile, in the cushion 10, the bent-over portion 12 is long, so interference with the headliner 146 at the rear end 14 side continues.

FIG. 5(d) illustrates the respective states of the cushion 102 and the cushion 10 at 18 msec after operation of the inflator 106 (see FIG. 1(a)) commences. At this point in time, interference between the cushion 10 and the headliner 146 at the rear end 14 side thereof has also been eliminated, and the cushions 102 and 10 have both inflated and deployed so as to take on substantially similar forms.

As described above, the cushion 102 is first provided with the folded over portion 138 and the bent-over portion 142 at the rear end 136 thereof in the vehicle front-rear direction, and is therefore short in the vehicle front-rear direction. Accordingly, the cushion 102 is easily stored in the limited storage space on the inner side of the headliner 146. In vehicles such as a trucks or SUVs (Sport Utility Vehicles), for example, there are cases where a pillar having a shape which is relatively upright with respect to the vehicle front-rear direction is present at a rear side, such that the storage space for the curtain airbag cushion is more limited. Even in such a case, the cushion 102 can also be suitably stored in a limited storage space. Moreover, in the cushion 102, the length D1 (see FIGS. 4(a) and 4(b)) of the bent-over portion 142 is short due to initial formation of the folded over portion 138. Accordingly, an operation in which the bent-over portion 142 is eliminated during inflation and deployment is smaller, and the degree to which the cushion 102 interferes with the headliner 146 is also reduced. As described above, the present embodiment allows the cushion 102 to be quickly inflated and deployed so that an occupant can be restrained at an early stage.

Figure 6:
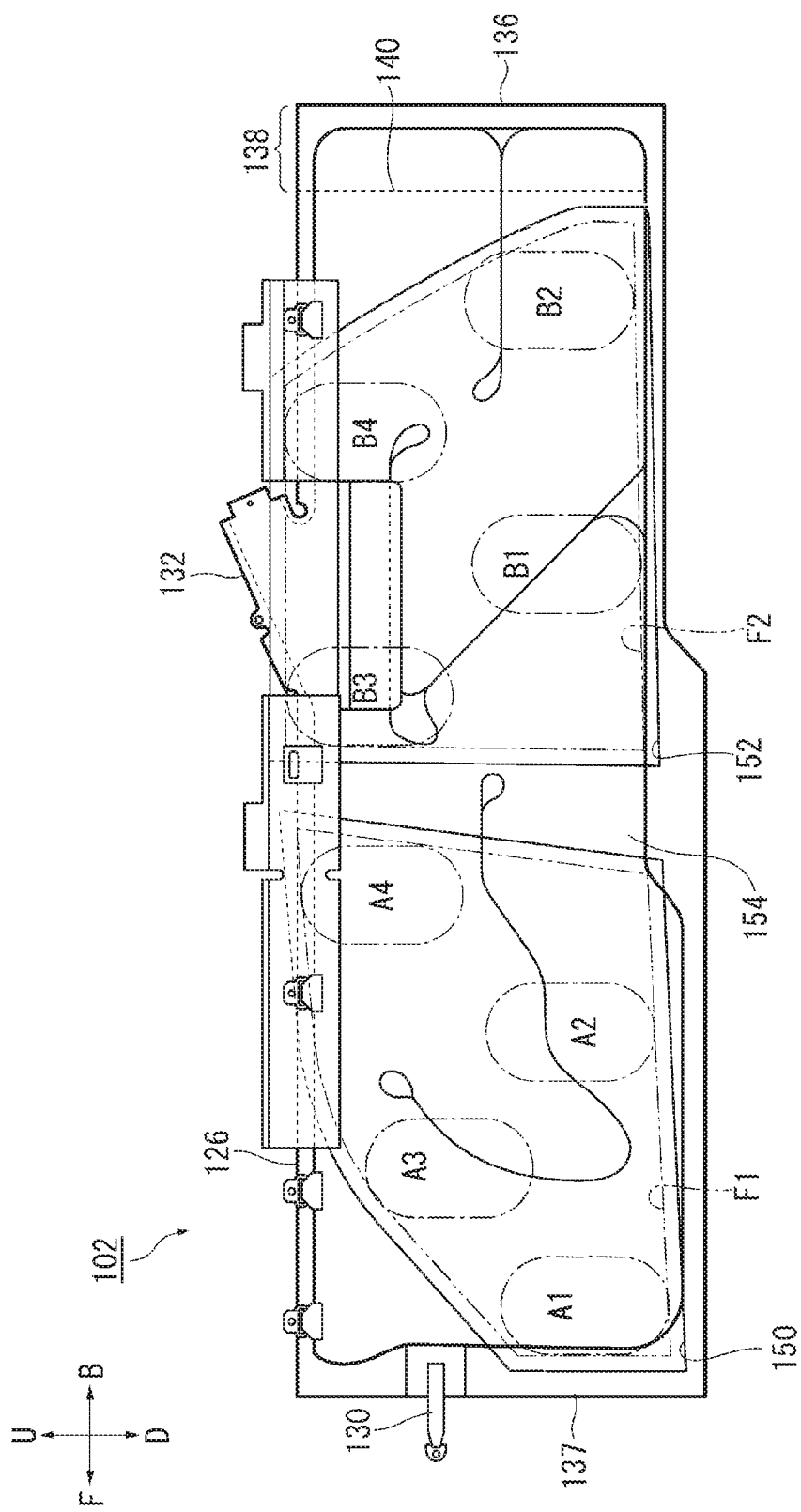
FIG. 6 is a side view illustrating further aspects of the cushion shown in FIG. 3(a).

FIG. 6 is a diagram illustrating further aspects of the cushion 102 shown in FIG. 3(a). In the present embodiment, the folded over area, i.e. the folded over portion 138 is set to be an area of the cushion 102 which is removed from a plurality of strike point positions (A1 to A4 and B1 to B4) of a testing apparatus in an ejection mitigation performance evaluation test. A summary of the strike point positions (A1 to A4 and B1 to B4) in the ejection mitigation performance evaluation test is given below.

A1 to A4 and B1 to B4 illustrated in FIG. 6 are strike points of an impactor (occupant-simulating testing apparatus) in an ejection mitigation performance evaluation test based on a recent (as of the filing of this application) NPRM (Notice of proposed rulemaking) of FMVSS 226 (Federal Motor Vehicle Safety Standards). The ejection mitigation performance evaluation test is a test defined by the NPRM (NHTSA-2009-0183).

The impactor is stipulated in V. "Proposed Ejection Mitigation Requirements and Test Procedures" of the same NPRM (NHTSA-2009-0183). Collision targets of the impactor are stipulated by target locations defined in V. "Proposed Ejection Mitigation Requirements and Test Procedures", d. "Locations Where the Device Would Impact the Ejection Mitigation Countermeasure To Asses Efficacy", and 4. "Method for Determining Impactor Target Locations" of the same NPRM (NHTSA-2009-0183). These strike points correspond to the strike point positions of each target described in the same NPRM and are illustrated, for example, by each point indicated by A1 to A4 and B1 to B4.

Each strike point is set for open regions 150 and 152 (daylight openings), which are respectively covered by the front side window and the rear side window, and the cushion 102 is designed to cover each of these strike points. Note that the daylight openings are defined as areas obtained by projecting side window openings (including 50 mm portions in the vehicle for window glass) horizontally towards a central plane (the vertical plane obtained by cutting down the center of the vehicle in the front-rear direction) in the vehicle front-rear direction.

Each of the strike point positions, such as the strike point position A1, has a prescribed area which conforms to the shape of the impactor, and the strike point positions are set at various locations in the daylight openings. As a summary of the setting procedure, offset lines F1 and F2 (lines obtained by moving the outer edges of the daylight openings towards the center by 25±2 mm) are initially set in the daylight openings. Then, the outline of the impactor (outline of the head form of the impactor) is arranged at positions where the outline is in contact with (within 2 mm of) the offset lines F1 and F2 at prescribed locations, and these positions are determined as the strike point positions.

More specifically, main target positions (equivalent to the strike point positions A1, A4, B2, and B3 in the present embodiment) are determined first. Initially, in each daylight opening, a vertical line and a horizontal line which pass through a center thereof are drawn, whereby each daylight opening is divided into four sections. Among these four sections, in the daylight opening on the vehicle front side of the center pillar 154, for example, the lower front section and the upper rear section are the main quadrants. Further, in the daylight opening on the vehicle rear side of the center pillar 154, the upper front section and the lower rear section are the main quadrants. In these main quadrants, the outline of the impactor described above is arranged so as to be in contact with the offset lines F1 and F2 at two or three points, thereby forming the main target positions (strike point positions A1, A4, B3, and B2).

Next, secondary target positions (equivalent to the strike point positions A3, A2, B1, and B4, for example) are determined. First, in each daylight opening, two vertical lines are drawn so as to trisect the area thereof between the two main target positions that have already been determined (between A1 and A4 and between B3 and B2). Outlines of the impactor are then arranged so that the centers thereof are on these vertical lines and, in the lower sections of the aforementioned four sections, the bottom of the outline is in contact with the offset lines F1 and F2 and, in the upper sections, the top of the outline is in contact with the offset lines F1 and F2. These positions form the secondary target positions (strike point positions A2, A3, B1, and B4).

However, when the window frame itself is small, for example, the method for determining a secondary target position is different. When the window frame is small and the distance between two main target positions already determined is 360 mm or more, an intermediate point on a straight line connecting the strike point centers of these strike point positions is determined as the secondary target position.

During a side surface collision test based on the NPRM cited above, an amount of movement of the impactor towards the vehicle outer side is measured with each of the strike point positions set as described above as a reference. The standard for measuring the amount of movement thereof at such a time is a vertical surface that abuts the outermost surface of the impactor in a state where the impactor is touching the inner surface of the side window.

As described above, in the present embodiment, the area to be folded over as the folded over portion 138 (see FIG. 3(a)) is set to be an area outside the plurality of strike point positions A1 to A4 and B1 to B4 in the vehicle front-rear direction. For example, the fold 140 of the folded over portion 138 is provided behind the strike point position B2 at the rear end side. The impactor, that is, the testing apparatus, also serves to simulate an occupant. Therefore, by using the strike point positions A1 to A4 and B1 to B4 as a guide and folding over an area which does not encompass any of the strike point positions A1 to A4 and B1 to B4, a compact storage form for the cushion 102 is realized without affecting the occupant ejection mitigation performance thereof.

In the present embodiment, the folded over portion 138 and the bent-over portion 142 are provided at the rear end 136 side of the cushion 102, however, the present embodiment is not limited to such a configuration, and a similar folded over portion and bent-over portion can also be provided at a front end 137 side of the cushion 102. When a folded over portion and a bent-over portion are provided at the front end 137 side, a compact storage form for the cushion 102 can be realized without affecting the occupant ejection mitigation performance thereof by folding over an area other than that which encompasses the strike point positions A1 to A4 and B1 to B4 described above.

Figure 7A:
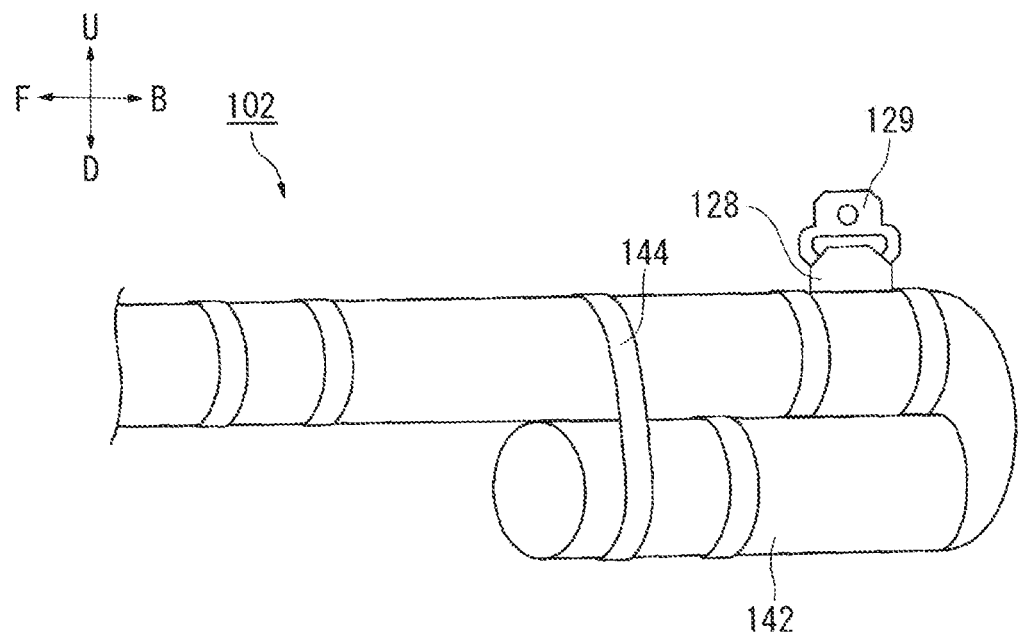
FIGS. 7(a) and 7(b) are partial isometric views illustrating the bent-over portion shown in FIG. 3(c) and a modified example thereof.
Figure 7B:
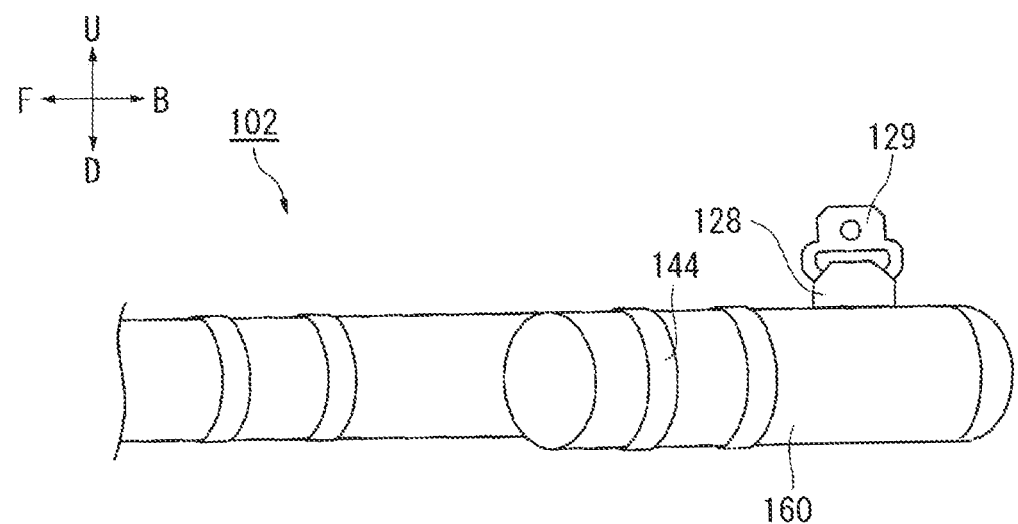

FIGS. 7(a) and 7(b) are diagrams illustrating the bent-over portion 142 shown in FIG. 3(c) and a modified example thereof. FIG. 7(a) is an enlarged view of the bent-over portion 142 shown in FIG. 3(c). As illustrated in FIG. 7(a), the bent-over portion 142 is bent over to a vehicle lower side so that the rear end of the cushion 102 in the rolled state is oriented towards the front of the vehicle. With the bent-over portion 142 bent over to the vehicle lower side, an operation in which the bending over is eliminated takes place at the vehicle lower side. As the inflation and deployment of the entire cushion 102 also advances downwards as the rolling thereof is eliminated, using the bent-over portion 142 bent over to the vehicle lower side allows the deployment behaviour of the cushion 102 to be stabilized without hindering the deployment behaviour of the cushion 102.

FIG. 7(b) is a diagram illustrating a modified example of the bent-over portion 142 shown in FIG. 7(a). As illustrated in FIG. 7(b), the bent-over portion 160 is bent over to a vehicle inner side in the vehicle width direction so that the rear end of the cushion 102 in the rolled state is oriented towards the front of the vehicle. With the bent-over portion 160 bent over to the vehicle inner side, an operation in which the bending over is eliminated takes place at the vehicle inner side. The cushion 102 prior to the formation of the bent-over portion 160 is formed in a rolled state by rolling the cushion 102 from the below on the vehicle inner side, hence an operation in which this rolling is eliminated also takes place on the vehicle inner side. Accordingly, the bent-over portion 160 bent over to the vehicle inner side also allows the deployment behaviour of the cushion 102 to be stabilized without hindering the deployment behaviour of the cushion 102.

Although a preferred embodiment of the present invention has been described above with reference to the accompanying drawings, the embodiment described above is a preferred example of the present invention, and other embodiments can also be implemented or executed by various methods. Unless specifically indicated otherwise in the description of the present application, the present invention is not limited to the shapes, sizes, configuration arrangements, and so on of the detailed components shown in the accompanying drawings. Further, the expressions and terms used in the description of the present application are for explanatory purposes and, unless specifically indicated otherwise, are not limited thereto.

While the above description constitutes the preferred embodiment of the present invention, it will be appreciated that the invention is susceptible to modification, variation and change without departing from the proper scope and fair meaning of the accompanying claims.

The invention claimed is:

1. A curtain airbag apparatus for a vehicle comprising:
an inflator which supplies a gas; and
a cushion which is stored in an elongated storage form in a vehicle front-rear direction, on an inner side of a headliner of the vehicle above a side window of the vehicle, and receives the gas so as to inflate and deploy, wherein
the cushion in the storage form has a bent-over portion which is bent over a front end or a rear end of the cushion towards a center side thereof from a state in which the cushion is folded or rolled upwards from below,
the state in which the cushion is folded or rolled is achieved by folding or rolling the cushion from a state in which a prescribed area at a front end side or a rear end side of the cushion in a deployed state is folded over towards the center side in the vehicle front-rear direction, and
the bent-over portion of the cushion in the folded or rolled state includes at least a portion of the folded over portion.

2. The curtain airbag apparatus according to claim 1, further comprising, the prescribed area to be folded over is the rear end side of the cushion.

3. The curtain airbag apparatus according to claim 1, further comprising, the prescribed area to be folded over is an area of the cushion outside a plurality of strike point positions of a testing apparatus in an ejection mitigation performance evaluation test.

4. The curtain airbag apparatus according to claim 1, further comprising, a fold, at which the fold over is implemented, is formed in an inflation region of the cushion into which gas is introduced.

5. The curtain airbag apparatus according to claim 1, further comprising, the prescribed area to be folded over is folded over to a vehicle inner side in a vehicle width direction.

6. The curtain airbag apparatus according to claim 1, further comprising, the bent-over portion is bent over to a vehicle lower side.

7. The curtain airbag apparatus according to claim 1, further comprising, the bent-over portion is bent over to a vehicle inner side in the vehicle width direction.

8. The curtain airbag apparatus according to claim 1, further comprising, a length of the folded over position in the vehicle front-rear direction is less than a length of the bent-over position in the front-rear direction.

* * * * *